United States Patent [19]

Kitano et al.

[11] Patent Number: 4,671,903

[45] Date of Patent: Jun. 9, 1987

[54] SULFONATION METHOD OF POLYSTYRENE

[75] Inventors: Kyozo Kitano, Narashino; Fumihiro Mikuchi; Toshimi Terao, both of Chiba, all of Japan

[73] Assignee: Lion Corporation, Tokyo, Japan

[21] Appl. No.: 914,978

[22] Filed: Oct. 3, 1986

[30] Foreign Application Priority Data

Feb. 7, 1986 [JP] Japan ................................. 61-25269
Oct. 4, 1985 [JP] Japan ................................. 60-221655

[51] Int. Cl.$^4$ ............................................ C07C 143/24
[52] U.S. Cl. ................................................. 260/505 R
[58] Field of Search ................................... 260/505 R

[56] References Cited

PUBLICATIONS

Whiley et al., JACS, pp. 720–723, vol. 76 (1954).

Primary Examiner—Alan Siegel
Attorney, Agent, or Firm—Armstrong, Nikaido, Marmelstein & Kubovcik

[57] ABSTRACT

A method for sulfonating polystyrene having an average molecular weight of 200 to 50,000 in a halogenated hydrocarbon solvent comprising the step of reacting the polystyrene with a sulfonating agent under a condition of a shearing force of 0.08 to 1.5 N/cm$^2$ by using an agitator satisfying the following requirements (I) and (II):

$$0.1 < d/l < 0.7 \quad \text{(I)}$$

$$4 < Q/V < 400 \quad \text{(II)}$$

wherein d is a blade diameter (m) of the agitator, l is a nominal diameter of a mixing reaction chamber, Q is a discharge amount (m$^3$/min) of the agitator, V is a liquid volume (m$^3$) of the mixing reactor chamber, and Q/V represents a circulation number (l/min).

7 Claims, No Drawings

SULFONATION METHOD OF POLYSTYRENE

BACKGROUND OF THE INVENTION

1. Field of the Invention

The present invention relates to a method for producing a water-soluble sulfonated product of polystyrene having a high purity and containing a small amount of by-products at a high yield.

2. Description of the Related Art

Various sulfonating methods of polystyrene have been proposed. For example, polystyrene is sulfonated by chlorosulfonic acid in a chlorinated hydrocarbon by adding one or more of water, sulfuric acid, hydrochloric acid, methyl alcohol, and ethyl alcohol as proposed in Japanese Examined Patent Publication (Kokoku) No. JP-B-50-33838, an anionic compound such as a polystyrene sulfonate and/or a nonionic compound such as methyl cellulose is added in the sulfonation reaction as proposed in Japanese Examined Patent Publication (Kokoku) No. JP-B-51-37226, or the hydrogen halide salt of a Lewis base (e.g., alkali halide such as NaCl) is added in the sulfonation reaction as proposed in Japanese Examined Patent Publication (Kokoku) No. JP-B-51-37227. These methods are all intended to obtain water-soluble polystyrene sulfonate containing a small amount of by-products at a high yield, while preventing the formation of crosslinking by —$SO_2$— at the intermolecules or inner molecules of the polystyrene. However, the methods proposed in Nos. JP-B-50-33838 and JP-B-51-37226 have problems in that, since water is present in the reaction system, the water forms, together with the halogenated hydrocarbon solvent, a heterogeneous system and, therefore, it is difficult to uniformly disperse the water in the system and to maintain the homogeneous reaction system, and that, since the water is reacted with the sulfonating agent, the necessary amount of the sulfonating agent is unpreferable increased. On the other hand, the method disclosed in No. JP-B-51-37227 has problems in that, since the inorganic salt is used in the sulfonation reaction, the inorganic salt must be separated from the reaction mixture, after completing the sulfonation reaction, which is not effective as a practical process. Furthermore, the above-mentioned methods are not satisfactory from the viewpoints of, for example, the prevention of crosslinking at the intermolecules or innermolecules of polystyrene, and the yield. Especially, a serious problem occurs in the industrial scale in that the quantities of the sulfonation products are largely fluctuated.

On the other hand, the present inventors proposed in Japanese Patent Application No. 60-91038 that specified amounts of a benzene sulfonic acid and/or an alkylbenzene sulfonate having a $C_1$-$C_{20}$ alkyl group be used, and that specified sulfonating be used in the sulfonation of polystyrene. However, although this technique can produce the desired sulfonated polystyrene at a yield higher than those of the above-mentioned prior art, there still remains a need to develop polystyrene sulfonation methods having a lower by-product content at a higher yield.

SUMMARY OF THE INVENTION

Accordingly, the objects of the present invention are to eliminate the above-mentioned disadvantages of the prior art and to provide a method for producing water-soluble sulfonated polystyrene having a high purity and containing a small amount of by-products at a high yield.

Another object of the present invention is to provide a method for sulfonating polystyrene, as an industrial mass production process, at a high sulfonation degree by using a lower mol ratio to obtain the desired sulfonation product having a stable quality.

Other objects and advantages of the present invention will be apparent from the following description.

In accordance with the present invention, there is provided a method for sulfonating polystyrene having an average molecular weight of 200 to 50,000 in a halogenated hydrocarbon solvent, comprising the step of reacting the polystyrene with a sulfonating agent under a condition of a shearing force of 0.08 to 1.5 N/cm² by using an agitator, satisfying the following requirements (I) and (II):

$$0.1 < d/l < 0.7 \quad \text{(I)}$$

$$4 < Q/V < 400 \quad \text{(II)}$$

where d is a blade diameter (m) of the agitator, l is a nominal diameter of a mixing reaction chamber, Q is a discharge amount (m³/min) of the agitator, V is a liquid volume (m³) of the mixing reaction chamber, and Q/V represents a circulation numbers (l/min).

DESCRIPTION OF THE PREFERRED EMBODIMENTS

According to the present invention, the above-mentioned disadvantages of the prior art can be effectively solved. Thus, although the theoretical mechanism has not been analyzed, the efficiency of the contact between the polystyrene and the sulfonating agent can be remarkably increased and the formation of crosslinking between the intermolecules and inner molecules of the polystyrene can be effectively prevented by the above-mentioned combination of the specified conditions, that is, by the use of an agitator having the specified range of circulation number, the specified combinations of the agitator and the mixing reaction chamber, and the sulfonation under the conditions subjecting it to the high shearing force.

The polystyrenes usable as the starting material in the present invention are those having a weight-average molecular weight of 200 to 50,000. When the average molecular weight of polystyrene is more than 50,000, the viscosity of the reaction mixture is unpreferably increased and, therefore, the handling thereof becomes difficult. Contrary to this, when the average molecular weight is less than 200, polymerization of the polystyrene occurs, simultaneously with the sulfonation due to the presence of the unreacted styrene monomer and, therefore, the amount of water-insoluble sulfonated products is unpreferably increased.

In the practice of the present invention, the starting polystyrene is dissolved in a halogenated hydrocarbon solvent. The preferable halogenated hydrocarbon solvents usable in the present invention are those which are inactive against the sulfonating agents. Typical examples of the halogenated hydrocarbon solvents are halogenated aliphatic hydrocarbons having 1 to 2 carbon atoms such as methylene chloride, 1,2-dichloroethane, ethyl chloride, carbon tetrachloride, 1,1-dichloroethane, 1,1,2,2-tetrachloroethane, chloroform, and ethylene dibromide. The amount of the solvent used in the present invention is preferably 1 to 30 parts by weight, more preferably 5 to 20 parts by weight, based on 1 part by weight of the starting polystyrene.

As mentioned above, according to the present invention, the above-mentioned polystyrene solution is charged into a reaction vessel provided with an agitator satisfying the above-mentioned requirements (I) and (II) and the reaction mixture is sulfonated under the condition that the reaction solution is subjected to a shearing force of 0.08 to 1.5 N/cm$^2$. The above-mentioned requirement (I) denotes that the diameter d of the agitator blade must be within the specified dimension range to the nominal or representative diameter 1 of the mixing reaction chamber. When d/l is less than 0.1 or more than 0.7, a uniform mixing cannot be effected and, therefore, the formation of crosslinking between the intermolecules or inner molecules of the polystyrene is unpreferably increased. The preferable range is as follows.

$$0.3 < d/l < 0.6 \qquad (I')$$

Furthermore, in order to increase the contact efficiency between the polystyrene and the sulfonating agent, it is important that the circulation number Q/V should be between 4 and 400 (l/min), as shown in the above-mentioned formula (II), preferably between 15 and 100. Furthermore, according to the present invention, it is necessary to apply a shearing force of 0.08 to 1.5N/cm$^2$, preferably 0.3 to 1.3N/cm$^2$. When the shearing force is smaller than 0.08N/cm$^2$, the sulfonated product is separated from the solvent and, therefore, the sulfonating efficiency is unpreferably decreased because the sulfonation reaction did not proceed effectively. In addition, the water-insoluble matter is unpreferably increased. Contrary to this, if the shearing force is larger than 1.5N/cm$^2$, the necessary power is uneconomically increased.

The above-mentioned agitating conditions according to the present invention can be readily effected by, for example, the following means. The agitators satisfying the above-mentioned requirement (I), for example, various homomixers, are first selected by taking into account the reaction apparatus, and the revolution number of the selected agitator is determined so that the discharge amount thereof satisfies the requirement (II). Simultaneously, the shearing force is calculated from the correlation between the necessary power of the agitator and the discharge amount. When the calculated shearing force falls within the range of 0.08 to 1.5N/cm$^2$, this agitator is used in the sulfonation at the above-mentioned revolution number of the agitator. In the practice of the present invention, the sulfonation reaction can be carried out either batchwise or continuously (i.e., in-line type reaction) as long as the above-mentioned agitating conditions are used.

The sulfonating agents usable in the present invention under the above-mentioned agitating conditions include, for example, liquid SO$_3$, gaseous SO$_3$, SO$_3$ containing gases, oleum, chlorosulfonic acid, and SO$_3$ complexes. In the case of SO$_3$ containing gases, inert gases such as nitrogen, dry air, and argon containing 1 to 12% by volume of SO$_3$, preferably 3 to 4% by volume of SO$_3$ can be preferably used. In addition, the complexes of SO$_3$ with gaseous or liquid, organic or inorganic compounds having a dielectric constant of 11.5 or less, preferably 9 or less, at 25° C. can be preferably used as the sulfonating agent. Typical examples of such complexes are those of SO$_3$ with, for example, dioxane, thioxane, dimethylaniline, triethylamine, hydrogen chloride, benzoic acid, triethyl phosphate, ethyl acetate, ethyl palmitate, diethyl ether, morpholine, and isoquinoline.

The sulfonation reaction can be preferably carried out by using the sulfonating agent in an amount of 0.5 to 20 moles, more preferably 0.7 to 1.5 moles, based on 1 mole of the styrene unit constituting the starting polystyrene. When the mole ratio of the sulfonating agent is too small, the sulfonation degree is insufficient and the content of the water-insoluble matter is unpreferably increased. Contrary to this, when the mole ratio of the sulfonating agent is too large, the intermolecular or innermolecular crosslinking is likely to occur, and the contents of the unpreferable by-products and water-insoluble matter are increased.

The sulfonation reaction can be suitably carried out at a temperature of 10° C. to 80° C., preferably 30° C. to 40° C. When the sulfonation reaction temperature is too low, the progress of the sulfonation reaction is unpreferably slow. Contrary to this, when the temperature is too high, the formation of the intermolecular or intramolecular crosslinking of the polystyrene is unpreferably increased.

According to the preferred embodiment of the present invention, benzene sulfonic acid and/or alkylbenzene sulfonic acids having an alkyl group with 1 to 20 carbon atoms can be preferably used, preferably in an amount of 0.5 to 100 parts by weight, more preferably 5 to 50 parts by weight, based on 100 parts by weight of the polystyrene in the sulfonation reaction mixture, to further prevent the intermolecular or intramolecular crosslinking of polystyrene.

In the practice of the present invention, the desired polystyrene sulfonic acid can be obtained in the form of a dispersion in the halogenated hydrocarbon solvent after completing the sulfonation reaction. After neutralizing and solvent removing, the desired water-soluble polystyrene sulfonate having a high purity can be obtained. When the benzene sulfonic acid or alkylbenzene sulfonic acids are used, the sulfonic acids are simultaneously neutralized to form the corresponding sulfonates. However, since these sulfonates have the same charge, the dissociation functions are not adversely effected in any way.

As mentioned above, according to the present invention, the desired polystyrene sulfonates having a high purity and containing only a small amount of water-insoluble matter can be obtained at a high yield. It is believed that, when the above-mentioned sulfonating conditions are adopted, the localized reaction can be suppressed and the sulfonation reaction can uniformly proceed as a whole and, therefore, the selective reactivity of the sulfonating agent to the aromatic ring is increased. As a result, polystyrene sulfonate having a small amount of the crosslinking structure and an excellent water-solubility can be produced at a high yield. Furthermore, since the high sulfonation degree can be obtained with the used of a lower molar ratio of the sulfonating agent, the amount of the sulfonating agent used in the reaction can be advantageously reduced and the separation and purification steps can be advantageously omitted due to the remarkable decrease in the formation of, for example, inorganic salts. Still furthermore, since the process control can be easily carried out, the desired quality stability can be maintained as a mass production process and, therefore, the present process is obviously excellent as an industrial process.

Accordingly, the sulfonated polystyrene obtained by the present process can be widely used as, for example, an anti-static agent for paper, a water reducing agent for concreate, and a dispersant.

EXAMPLES

The present invention now will be further illustrated by, but is by no means limited to, the following Examples.

EXAMPLE I

Polystyrene having an average molecular weight of 2,000 was dissolved in 1,2-dichloroethane and alkylbenzene sulfonic acid was uniformly dissolved therein. Thus, a solution containing 10% by weight polystyrene and 1% by weight of alkylbenzene sulfonic acid was prepared. A 600 ml amount of the solution was charged into a sulfonation reaction vessel having an inner diameter of 0.15 m and various agitators listed in Table 1 were used and agitated under the various conditions listed in Table 1.

Thereafter, while the reaction temperature was maintained at 30° C., the sulfonation reaction was carried out by using sulfuric anhydride ($SO_3$) as a sulfonating agent in an amount of 1 mol of $SO_3$ based on the styrene unit constituting the polystyrene. The introduction rate of the sulfonating agent was 0.7 g/min, in terms of $SO_3$, and the reaction time was about 60 minutes.

The results and the agitating conditions are shown in Table 1.

In the Table, the paddle type agitator, available from Shintou Kagaku Co., Ltd., is a batch type agitator, the homomic flow mixer is a batch type or continuous type mixer, the pipe line homomixer is an inline mixer for a continuous reaction, both available from Tokushuki Kako Co., Ltd. Furthermore, the yield of the sulfonate was determined from the equation;

$$\frac{\text{Water} - \text{soluble matter}}{\text{Water} - \text{insoluble matter} + \text{Water} - \text{soluble matter}} \times 100$$

The sulfonation degree was determined as the introduction % of a sulfonic group based on the styrene unit. Furthermore, the shearing force ($N/cm^2$) was determined from the following equation:

$$\text{Shearing force} = \frac{Np \cdot \rho \cdot n^3 \cdot d^5/gc}{Nq \cdot n \cdot d^3} \times 10^{-4} [N/cm^2]$$

wherein
Np: Power number (—)
n: Revolution number (1/sec)
Nq: Discharge flow rate number (—)
d: Diameter of blade (m)
$\rho$: Density ($kg/m^3$)
gc: Gravity force conversion factor ($kg \cdot m/sec^2 \cdot N$).

TABLE 1

| Run No. | Comparative | | | | Example | | |
|---|---|---|---|---|---|---|---|
| | 1 | 2 | 3 | 4 | 5 | 6 | 7 |
| Agitating type | Paddle | | Homomic flow | | | Homomic flow | |
| Blade diameter (m) | 0.05 | | 0.04 | | | 0.04 | |
| d/l | | 0.2 | | | | 0.2 | |
| Revolution number (rpm) | 1000 | 2000 | 1000 | 1600 | 2000 | 3500 | 4000 |
| Circulating number (l/min) | 1 | 3 | 3 | 6 | 5 | 15 | 50 |
| Required agitating power (N) | $4 \times 10^{-5}$ | $3.3 \times 10^{-4}$ | $6.8 \times 10^{-5}$ | $2.8 \times 10^{-4}$ | $5.5 \times 10^{-4}$ | $31.5 \times 10^{-4}$ | $44.0 \times 10^{-4}$ |
| Shearing force ($N/cm^2$) | $0.48 \times 10^{-1}$ | $1.92 \times 10^{-1}$ | $2.2 \times 10^{-2}$ | $0.6 \times 10^{-1}$ | $0.89 \times 10^{-1}$ | $2.72 \times 10^{-1}$ | $3.55 \times 10^{-1}$ |
| Yield of sulfonate (%) | 80 | 82 | 85 | 84 | | | |
| Inorganic amount (% based on water-soluble matter) | 20 | 18 | 10 | 11 | | | |
| Introduction % of sulfonic group (based on styrene unit) | 75 | 77 | 79 | 77 | 85 | 87 | 90 |
| Sulfonate yield (%) | | | | | 90 | 92 | 92 |
| Inorganic content (% based on water-soluble matter) | | | | | 5 | 5 | 4 |

| Run No. | Example | | | | |
|---|---|---|---|---|---|
| | 8 | 9 | 10 | 11 | 12 |
| Agitating type | Homomic flow | | Pipeline homomixer | | |
| Blade diameter (m) | 0.04 | | 0.04 | | |
| d/l | 0.2 | | 0.6 | | |
| Revolution number (rpm) | 7500 | 2000 | 3500 | 4000 | 7500 |
| Circulating number (l/min) | 80 | 50 | 90 | 100 | 400 |
| Required agitating power (N) | $29.1 \times 10^{-3}$ | $4.4 \times 10^{-4}$ | $23.4 \times 10^{-4}$ | $34.8 \times 10^{-4}$ | $23.0 \times 10^{-4}$ |
| Shearing force ($N/cm^2$) | $12.5 \times 10^{-1}$ | $0.89 \times 10^{-1}$ | $2.72 \times 10^{-1}$ | $3.55 \times 10^{-1}$ | $12.5 \times 10^{-1}$ |
| Yield of sulfonate (%) | | | | | |
| Inorganic amount (% based on water-soluble matter) | | | | | |
| Introduction % of sulfonic group (based on styrene unit) | 90 | 85 | 86 | 89 | 90 |
| Sulfonate yield (%) | 92 | 90 | 91 | 92 | 92 |
| Inorganic content (% based on water-soluble matter) | 4 | 5 | 5 | 4 | 4 |

As is clear from the results shown in Table 1, the sulfonate yields are as high as 90% or more and the amount of inorganic salt (i.e., sodium sulfate) in the water-soluble matter is 5% or less in Run Nos. 5 to 12. Of these experiments, the sulfonate yields and the inorganic salt contents are excellent in, for example, Run Nos. 7, 8, 11, and 12 and, when the shearing force is within the range of 0.3 to 1.3, more preferable results can be obtained. Contrary to this, when the agitating conditions are not within the above-specified range as in Comparative Run Nos. 1 to 4, the sulfonate yields are low and the amounts of the inorganic salts are large. Furthermore, when the circulating number is not within the above-mentioned range the desired results cannot be obtained even if the shearing force is within the range specified in the present invention as shown in Run No. 2. On the other hand, when the shearing force is not within the range specified in the present invention, the desired results cannot be obtained even if the circulating number is within the range specified in the present invention as shown in Run No. 4.

EXAMPLE II

Polystyrene having an average molecular weight of 4000 was dissolved in 1,2-dichloroethane to prepare a solution containing 10% by weight polystyrene, a 600 ml amount of the solution was charged into a sulfonation reaction vessel having an inner diameter of 0.15 m, and various agitators listed in Table 2 were used and agitated under the various conditions listed in Table 2.

Thereafter, while the reaction temperature was maintained at 30° C., the sulfonation reaction was carried out by using sulfuric anhydride ($SO_3$) as a sulfonating agent in an amount of 1 mol of $SO_3$ based on the styrene unit constituting the polystyrene. The introduction rate of the sulfonating agent was 0.7 g/min, in terms of $SO_3$ and the reaction time was about 60 minutes.

The results and the agitating conditions are shown in Table 2.

We claim:

1. A method for sulfonating polystyrene having an average molecular weight of 200 to 50,000 in a halogenated hydrocarbon solvent comprising the step of reacting the polystyrene with a sulfonating agent under a condition of a shearing force of 0.08 to 1.5 N/cm² by using an agitator satisfying the following requirements (I) and (II):

$$0.1 < d/l < 0.7 \quad \text{(I)}$$

$$4 < Q/V < 400 \quad \text{(II)}$$

wherein d is a blade diameter (m) of the agitator, l is a nominal diameter of a mixing reaction chamber, Q is a discharge amount (m³/min) of the agitator, V is a liquid volume (m³) of the mixing reactor chamber, and Q/V represents circulation numbers (l/min).

2. A sulfonation method as claimed in claim 1, wherein the halogenated solvent is at least one halogenated aliphatic hydrocarbon having 1 to 2 carbon atom.

3. A sulfonation method as claimed in claim 1, wherein the amount of the halogenated solvent is 1 to 30 parts by weight based on 1 part of the polystyrene.

4. A sulfonation method as claimed in claim 1, wherein the agitator satisfy the following requirement:

$$0.3 \leq d/l \leq 0.6 \quad \text{(I')}$$

$$15 \leq Q/V \leq 100 \quad \text{(II')}$$

5. A sulfonation method as claimed in claim 1, wherein the shearing force is 0.3 to 1.3 N/cm².

6. A sulfonation method as claimed in claim 1, wherein at least one additive selected from the group consisting of benzene sulfonic acid and alkylbenzene sulfonic acids having an alkyl group with 1 to 20 carbon atoms is used.

7. A sulfonation method as claimed in claim 1, wherein the amount of the additive is 0.5 to 100 parts by weight based on 100 parts by weight of the polystyrene.

TABLE 2

| | Comparative | | Example | | | |
|---|---|---|---|---|---|---|
| Run No. | 13 | 14 | 15 | 16 | 17 | 18 |
| Agitating type | Paddle | Homomic flow | Homomic flow | | | Pipeline homomixer |
| Blade diameter (m) | 0.05 | 0.04 | | 0.04 | | 0.04 |
| d/l | 0.2 | | | 0.2 | | 0.6 |
| Revolution number (rpm) | 2,000 | 1,000 | 3,500 | 4,000 | 7,500 | 4,000 |
| Circulating number (l/min) | 3 | 3 | 15 | 50 | 80 | 100 |
| Required agitating power (N) | $3.3 \times 10^{-4}$ | $6.8 \times 10^{-5}$ | $31.5 \times 10^{-4}$ | $44.0 \times 10^{-4}$ | $29.1 \times 10^{-3}$ | $34.8 \times 10^{-4}$ |
| Shearing force (N/cm²) | $1.92 \times 10^{-1}$ | $2.2 \times 10^{-2}$ | $2.72 \times 10^{-1}$ | $3.55 \times 10^{-1}$ | $12.5 \times 10^{-1}$ | $3.55 \times 10^{-1}$ |
| Yield of sulfonate (%) | 72 | 68 | 90 | 90 | 91 | 90 |
| Inorganic content (% based on water-soluble matter) | 29 | 35 | 8 | 7 | 5 | 7 |
| Introduction % of sulfonic group (% based on styrene unit) | 77 | 79 | 88 | 90 | 92 | 90 |